May 19, 1925.
R. R. LOVE
SPRING SUSPENSION FOR VEHICLES
Filed Dec. 9, 1924
1,538,405
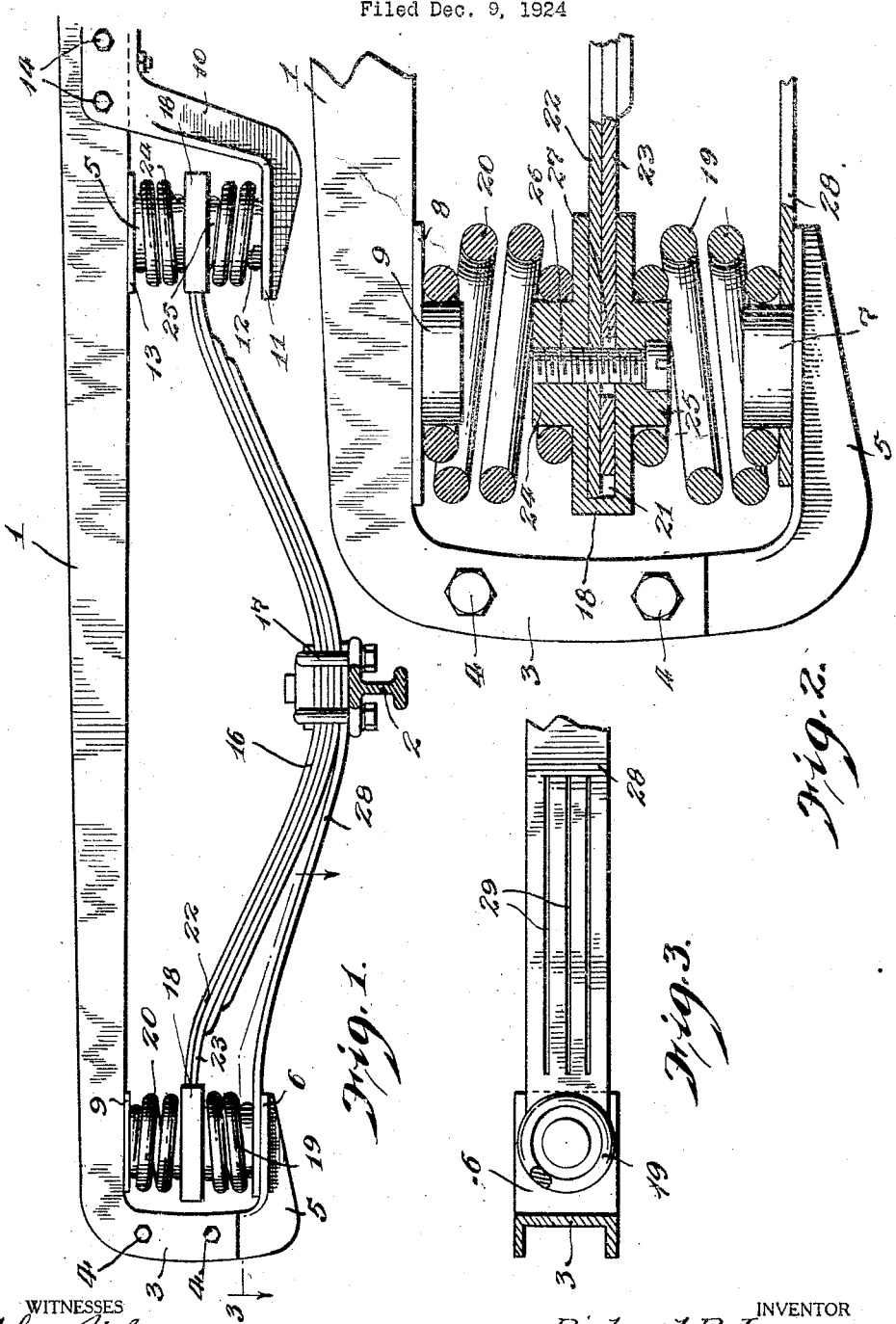
WITNESSES
INVENTOR
Richard R. Love,
BY
ATTORNEYS Patented May 19, 1925.

1,538,405

UNITED STATES PATENT OFFICE.

RICHARD RAEBURN LOVE, OF SALT LAKE CITY, UTAH.

SPRING SUSPENSION FOR VEHICLES.

Application filed December 9, 1924. Serial No. 754,820.

*To all whom it may concern:*

Be it known that I, RICHARD R. LOVE, a citizen of the United States, and a resident of Salt Lake City, in the county of Salt Lake and State of Utah, have invented certain new and useful Improvements in Spring Suspensions for Vehicles, of which the following is a specification.

This invention relates to spring suspension for vehicles and has for its object the provision of a device which will cushion side sway thereby reducing skidding to a minimum providing a shock absorber which is free from the resistance of levers and bearings and which eliminates the usual rattle caused by loose shackle bolts and the lack of lubrication.

A further object of the invention is the provision of a torque leaf provided with a plurality of slots which will prevent crystallization during the side sway of the vehicle relative to the axle and when the coil springs are employed for absorbing shocks.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view in elevation of the spring suspension constructed in accordance with my invention.

Figure 2 is an enlarged detail partly in section of the connecting means between the vehicle spring and the chassis spring.

Figure 3 is a horizontal section of the chassis taken along the line 3—3 of Figure 1.

Referring more particularly to the drawings, 1 designates the channel beam of the frame of the vehicle and 2 the front axle. The forward part of the beam 1 is bent downwardly as shown at 3 to which is removably connected at 4 a bracket 5. This bracket is provided with a substantially horizontal shelf 6 upon which is integrally formed a boss 7. A plate 8 secured to the under face of the beam 1 is provided with a depending boss 9 adapted to aline with the boss 7.

Secured in spaced relation with the downwardly bent portion 3 at the end of the beam 1 is a bracket 10 having a substantially horizontal shelf 11 provided with a boss 12. A second plate 13 spaced from the plate 8 is secured to the under face of the beam 1 adjacent the removable connection 14 of the bracket 10 with the beam 1, the plate being provided with a depending boss 15 alining with the boss 12 of the bracket 10.

A vehicle spring 16 composed of flat leaves is connected intermediate its ends to the axle 2 by the usual clamping element 17. A socket 18 is supported between a pair of coil springs 19 and 20 at each end of the vehicle spring 16 and the socket is provided with a slot 21 adapted to receive the outer ends of the end leaves 22 and 23 of the spring 16.

One face of the socket 18 is provided with a boss 24 adapted to receive one end of the coil spring 20 while the other end of the coil spring is received by the boss 9. The other face of the socket is provided with a boss 25 adapted to receive one end of the coil spring 19 while the other end of the coil spring is received by the socket 7. The bosses 24 and 25 are alined respectively with the bosses 7 and 9 and are provided with an internally threaded passage adapted to receive a bolt 26. The leaf 22 is provided with a perforation which neatly receives the bolt 26 while the leaf 23 is provided with a passage 27 of greater diameter than the bolt 26 whereby the outer end of the leaf 23 is permitted a relative amount of play with respect to the leaf 22 since the leaf 22 is rigidly locked with the socket 18. A similar socket is provided with oppositely projecting bosses alining with the bosses 12 and 15 projecting towards each other between the bracket 10 and the beam 1.

Secured to the axle 2 and the middle portion of the leaf spring 16 by means of the clamping element 17 is a torque leaf 28. The outer end of the leaf is provided with an opening adapted to receive the boss 7 on the bracket 5. This torque leaf maintains a predetermined relation between the frame 1 and the axle 2 during the side play of the frame relative to the axle. The leaf is slotted as shown at 29 adjacent its end to prevent crystallization during side movement of the frame relative to the axle and whereby the leaf is under tortional strain. A torque leaf 28 prevents back and forward motion of the axle which if not prevented would effect the steering of the vehicle to which the springs are applied.

What I claim is:

1. A spring suspension for vehicle frames comprising a vehicle spring having the ends of its longest leaves perforated, a socket provided with a slot adapted to receive the perforated ends of said leaves, bosses having internally threaded passages projecting in opposite directions from the sides of the sockets, a bolt screwed into the threaded passages in said bosses, and passing through the perforations in the leaves, the perforations in the end of one leaf having a greater diameter than the bolt whereby the ends of one leaf are locked to the respective sockets, the ends of the other leaf being permitted relative movement, brackets removably connected to the vehicle frame, a pair of coil springs, each spring receiving at its end a boss on the socket, the other end of one spring being held in place on the frame, the end of the other spring being held in place on the bracket.

2. A spring suspension for vehicle frames comprising a vehicle spring having the ends of its longest leaves perforated, a socket provided with a slot adapted to receive the perforated ends of said leaves, bosses having internally threaded passages projecting in opposite directions from the sides of the sockets, a bolt screwed into the threaded passages in said bosses, and passing through the perforations in the leaves, the perforations in the end of one leaf having a greater diameter than the bolt whereby the ends of one leaf are locked to the respective sockets, the ends of the other leaf being permitted relative movement, brackets removably connected to the vehicle frame, a pair of coil springs, each spring receiving at its end a boss on the socket, the other end of one spring being held in place on the frame, the end of the other spring being held in place on the bracket, a torque leaf provided with slots adjacent its ends, and connected between a bracket and the intermediate ends of the vehicle spring.

3. A spring suspension for vehicle frames comprising a vehicle spring having the ends of its longest leaves perforated, a socket provided with a slot adapted to receive the perforated ends of said leaves, bosses having internally threaded passages projecting in opposite directions from the sides of the sockets, a bolt screwed into the threaded passages in said bosses, and passing through the perforations in the leaves, the perforation in the end of one leaf having a greater diameter than the bolt whereby the end of one leaf has limited movement with respect to the socket, coil springs having an end received by a boss on the socket, and means for supporting the outer ends of the springs from the vehicle frame.

4. A spring for vehicle frames, a socket member into which the longest leaves of said spring are extended having means to clamp and hold one of the leaves, the other leaf having limited movement in the socket member, and means carried by the frame to support the socket member including vertically spaced spring members between which the socket member is engaged and yieldingly held.

RICHARD RAEBURN LOVE.